United States Patent [19]
Sato

[11] Patent Number: 5,594,553
[45] Date of Patent: Jan. 14, 1997

[54] VIDEO SIGNAL RECORDING AND REPRODUCING APPARATUS USING SIGNAL MODIFICATION TO REMOVE JITTER

[75] Inventor: Koichi Sato, Tokyo, Japan

[73] Assignee: Asahi Kogaku Kogyo Kabushiki Kaisha, Tokyo, Japan

[21] Appl. No.: 316,825

[22] Filed: Oct. 3, 1994

Related U.S. Application Data

[63] Continuation of Ser. No. 117,931, Sep. 7, 1993, abandoned.

[30] Foreign Application Priority Data

Sep. 4, 1992 [JP] Japan ................................. 4-263212

[51] Int. Cl.⁶ ............................ H04N 5/95; H04N 5/78
[52] U.S. Cl. .............................................. 386/88; 386/91
[58] Field of Search ...................... 358/310, 335, 358/320, 323, 337, 339; 360/36.1, 36.2, 33.1; H04N 5/76, 5/78, 5/781, 5/782, 5/783

[56] References Cited

U.S. PATENT DOCUMENTS

| | | | |
|---|---|---|---|
| 4,214,262 | 7/1980 | Mizukami | 358/339 |
| 4,555,734 | 11/1985 | Fukui . | |
| 4,607,360 | 8/1986 | Fukui . | |
| 4,614,981 | 9/1986 | Fukui . | |
| 4,631,600 | 12/1986 | Fukui . | |
| 4,709,276 | 11/1987 | Yoshinaka . | |
| 4,780,769 | 10/1988 | Numakura et al. | 358/320 |
| 4,875,096 | 10/1989 | Baer et al. | 348/476 |
| 4,977,462 | 12/1990 | Takanashi et al. | 358/339 |
| 5,140,435 | 8/1992 | Suzuki et al. | 358/335 |
| 5,142,375 | 8/1992 | Fukuda et al. | 358/310 |
| 5,166,803 | 11/1992 | Sasakura | 358/310 |
| 5,258,851 | 11/1993 | Yamaguchi | 358/320 |
| 5,442,455 | 8/1995 | Hioki et al. | 358/342 |
| 5,510,900 | 4/1996 | Shirochi et al. | 358/335 |

FOREIGN PATENT DOCUMENTS 2177792   7/1990  Japan .

OTHER PUBLICATIONS

"Digital Signal Processing for CHSV," ITEJ Technical Report, vol. 14, No. 76, pp. 9–10 and English translation of marked portion.

Milton S. Kiver and Milton Kaufman, Television electronics: Theory and Servicing, 1973, pp. 57–58.

Primary Examiner—Thai Q. Tran
Attorney, Agent, or Firm—Greenblum & Bernstein P.L.C.

[57] ABSTRACT

A first reference signal having a predetermined frequency is added to a video signal for a predetermined period of time. A second reference signal is further added to the video signal such that it delimits a starting point and length of the video information. The video signal, with the added reference signals, is recorded on a recording medium, such as a magnetic disk rotated by a spindle motor. The recorded video signal with the added reference signals is reproduced from the recording medium, and the first reference signal is extracted from the video signal. The video signal is stored in a memory using the timing characteristics of the extracted first reference signal, and stored over a time period which is based upon the second reference signal. The stored video signal is then read from the memory using a known clock rate. The first reference signal extracted from the reproduced video signal contains jitter information representative of speed fluctuations of the spindle motor. Thus, the jitter of the video signal is eliminated when the video signal is stored in the memory on the basis of the timing characteristics of the first reference signal.

11 Claims, 4 Drawing Sheets

PRIOR ART
FIG. I

VIDEO SIGNAL RECORDING AND REPRODUCING APPARATUS USING SIGNAL MODIFICATION TO REMOVE JITTER

This application is a continuation of application Ser. No. 08/117,931, filed Sep. 7, 1993, now abandoned.

BACKGROUND OF THE INVENTION

1. Field of the Invention

The present invention relates to an apparatus for recording and reproducing a video signal, and more specifically to an apparatus for recording a video signal on a recording medium, such as a magnetic disk or the like, and for reproducing a video signal recorded on such a recording medium.

2. Background and Material Information

Apparatus are known for recording a video signal on a recording medium, such as magnetic disk, or the like, and for reproducing a video signal recorded on such a recording medium. For recording a video signal on a magnetic disk, for example, in such a video signal recording and reproducing apparatus, a luminance signal (having a synchronizing signal) and a color difference signal are frequency-modulated and then recorded on the magnetic disk.

One problem with the video signal recording and reproducing apparatus is that an actuator such as an electric motor for rotating the magnetic disk tends to suffer speed fluctuations due to mechanical disturbances or electric signal instability, for example, when a video signal is recorded on the magnetic disk and when a video signal is reproduced from the magnetic disk. Furthermore, a video signal recorded on a magnetic disk with one recording apparatus and reproduced using a different apparatus could also produce an unstable image due to differences between the recording apparatus and the reproducing apparatus. In the presence of such speed fluctuations of the actuator, the video signal recorded on the magnetic disk contains jitter introduced with high fidelity. Therefore, video images displayed on a display unit based on the reproduced video signal are subject to aberrations in size or position, and flickering.

As shown in FIG. 1, a video signal recording and reproducing apparatus 200 according to the present invention records a luminance signal with a synchronizing signal Y+S, color difference signals R–Y, B–Y and reference signals, through a Y signal recording circuit 50 on a magnetic disk 70. Specifically, an output signal from the Y signal recording circuit 50 is supplied to a magnetic head 60, which records the signal on a magnetic disk 70 that is being rotated by a spindle motor 80.

The recording and reproducing processes of the video signal recording and reproducing apparatus 200 will be described below. In FIG. 1, video signal recording and reproducing apparatus 200 is shown as recording and reproducing a video signal Y+S that is composed of the luminance signal Y and a horizontal synchronizing signal S. The synchronizing signal includes a horizontal synchronizing signal H-SYNC, vertical synchronizing signal V-SYNC and an equalizing pulse.

First, the recording process will be described. A video signal Y+S is supplied from a video camera (not shown) to a synchronizing signal separator 10 and also an adder 35. The synchronizing signal separator 10 separates the H-SYNC and V-SYNC signals from the video signal Y+S. The synchronizing signal separator 10 supplies the separated H-SYNC signal to a burst gate pulse generator 20. The burst gate pulse generator 20 generates a train of burst gate pulses each having a predetermined period which lags behind the corresponding pulses of the separated horizontal synchronizing signal by a certain period of time. The burst gate pulses are required to write a reference signal (described later on). The synchronizing signal separator 10 also supplies the separated horizontal synchronizing signal to a clock generator 40 and a start flag generator 42 (described later on). The clock generator 40 generates clock pluses as a reference signal (burst signal) for correcting jitter when the video signal is reproduced.

A burst gate 30 is supplied with the burst gate pulses outputted from the burst gate pulse generator 20 and the reference signal outputted from the clock generator 40. The reference signal may comprise, e.g., a sine wave having a frequency which may be 227.5 times the frequency of the horizontal synchronizing signal. The burst gate 30 passes the reference signal to the adder 35 while each of the burst gate pulses is in an ON state, (i.e., HIGH). Therefore, the reference signal is applied to the adder 35 only during a period of time in which each burst gate pulse is high. The adder 35 adds the reference signal to the video signal Y+S.

The video signal recording and reproducing apparatus shown in FIG. 1 further includes a start flag generator 42 which generates and outputs a start flag which lags behind a burst gate pulse based on the horizontal synchronizing signal from the synchronizing signal separator 10 and the clock signal from the clock signal generator 40. The start flag outputted from the start flag generator 42 is supplied to an adder 47, which adds the start flag to the video signal Y+S that incorporates the reference signal. The adder 47 outputs the video signal Y+S with the reference signal and the start flag to a Y-signal recording circuit 50. The Y-signal recording circuit 50 frequency-modulates and records the supplied video signal on the magnetic disk 70 through a magnetic head 60 while the magnetic disk 70 is being rotated by the spindle actuator 80.

FIG. 3 shows the timing relationship between a video signal with a reference signal and added start flags, burst gate pulses from the burst gate pulse generator 20, and start flags from the start flag generator 42. An effective horizontal period lies between a start flag and the subsequent horizontal synchronizing signal.

To reproduce a recorded video signal representing a still image from the recording medium, video information is first stored in a memory based on a reproduced video signal, and thereafter the stored video information is read from the memory and applied to a display unit. For writing the video information in the memory based on the reproduced video signal, a start flag indicative of a position to start writing the video signal, i.e., a point of time where an effective horizontal period starts, is added to the video signal, and the effective horizontal period is detected by detecting the added start flag.

The reproducing process will be described in detail below. The video signal Y+S recorded on the magnetic disk 70 is read by the magnetic head 60 and then frequency-demodulated by a Y-signal reproducing circuit 90. The frequency-demodulated video signal Y+S is supplied from the Y-signal reproducing circuit 90 to a synchronizing signal separator 100, a start flag detector 102, a clock signal reproducing PLL (phase-locked loop) 120, and an A/D (analog-to-digital) converter 130. The synchronizing signal separator 100 separates the H-SYNC signal from the video signal Y+S. The synchronizing signal separator 100 supplies the separated H-SYNC signal to a burst gate pulse generator 110. The burst gate pulse generator 110 generates a train of burst gate pulses each having a predetermined period which lags behind the corresponding pulses of the separated H-SYNC signal by a certain period of time. The burst gate pulses are required to extract the reference signal (burst signal) from the video signal Y+S. The burst gate pulse generated 110 supplies the burst gate pulses to the clock signal reproducing PLL 120. The clock signal reproducing PLL 120 extracts the reference signal from the video signal Y+S, and generates a clock signal in synchronism with the reference signal. The clock signal generated by the clock signal reproducing PLL 120 includes jitter which may have been introduced due to speed fluctuations of the actuator 80 when the video signal Y+S is recorded on and/or reproduced from the magnetic disk 70. Therefore, the clock signal is not of a constant frequency but has frequency fluctuations in synchronism with the video signal Y+S that is read from the magnetic disk 70. The clock signal generated by the clock signal reproducing PLL 120 is applied to the A/D converter 130 and a memory 140.

The start flag detector 102 detects a start flag from the reproduced video signal Y+S. When the start flag detector 102 detects a start flag, it applies an output signal to a memory write signal generator 104, which outputs a memory write signal from a predetermined period of time, i.e., an effective horizontal period, to permit video information to be written into a memory 140.

More specifically, the video signal Y+S supplied to the A/D converter 130 is converted into a digital video signal based on the supplied clock signal which contains jitter information. The digital video signal is then stored into the memory 140. Thus, the digital video signal is stored in the memory 140 based on the clock signal that is synchronous with the frequency fluctuations of the video signal (i.e., having the same jitter). Therefore, the resulting video signal stored in the memory 140 is free from jitter since the jitter in the video signal is canceled by the jitter in the clock signal. The jitter is thus canceled when the video signal is written to memory, using the clock signal which is generated by the PLL 120.

The video signal stored in the memory 140 is then read out using a clock signal having a constant frequency which is generated by a clock generator 160. The read video signal is converted into an analog video signal by a D/A (digital-to-analog) converter 150 also based on the clock signal from the clock generator 160. The analog video signal is thereafter supplied to an adder 175, which combines the supplied analog video signal with a synchronizing signal that is generated by a synchronizing signal generator 170 based on the clock signal from the clock generator 160. The video signal thus combined with the synchronizing signal is then outputted from the adder 175 to a display unit (not shown).

SUMMARY OF THE INVENTION

It is therefore an object of the present invention to provide a video signal recording and reproducing apparatus which is capable of reproducing a desired video signal with high fidelity, even if an actuator for rotating a recording medium such as a magnetic disk undergoes speed fluctuations when the video signal is recorded on or reproduced from the recording medium.

According to an aspect of the present invention, an apparatus is provided for recording and reproducing a video signal. The apparatus includes a signal adding means, a recording means, reproducing means, signal extracting means, signal detecting means, and video signal extracting means.

The signal adding means adds a first reference signal and a second reference signal to the video signal to produce a modified video signal. The recording means records the modified video signal on the recording medium.

The reproducing means reproduces the modified video signal from the recording medium. The signal extracting means extract the first reference signal from the modified video signal reproduced by the reproducing means. The signal detecting means detect the second reference signal. The video signal extracting means extract the video signal from the modified video signal, and are controlled by signal characteristics of the extracted first reference signal and the detected second reference signal.

According to another aspect of the present invention, there is provided an apparatus for recording a video signal. The apparatus includes signal adding means for adding a first reference signal and a second reference signal to the video signal to produce a modified video signal, and recording means for recording the modified video signal on the recording medium.

According to a further aspect of the present invention, an apparatus is provided for reproducing a video signal from a recording medium, the video signal being contained within a modified video signal. The modified video signal further comprises a first reference signal and a second reference signal. The apparatus comprises reproducing means, signal extracting means, signal detecting means, and video signal extracting means.

The reproducing means reproduce the modified video signal from the recording medium, and then the signal extracting means extract the first reference signal from the modified video signal reproduced by the reproducing means. The signal detecting means detects the second reference signal in the modified video signal, and the video signal extracting means extract the video signal from the modified video signal. The video signal extracting means are controlled by signal characteristics of the extracted first reference signal and the detected second reference signal.

DESCRIPTION OF THE ACCOMPANYING DRAWINGS

DETAILED DESCRIPTION OF THE PREFERRED EMBODIMENTS

Figure 1:
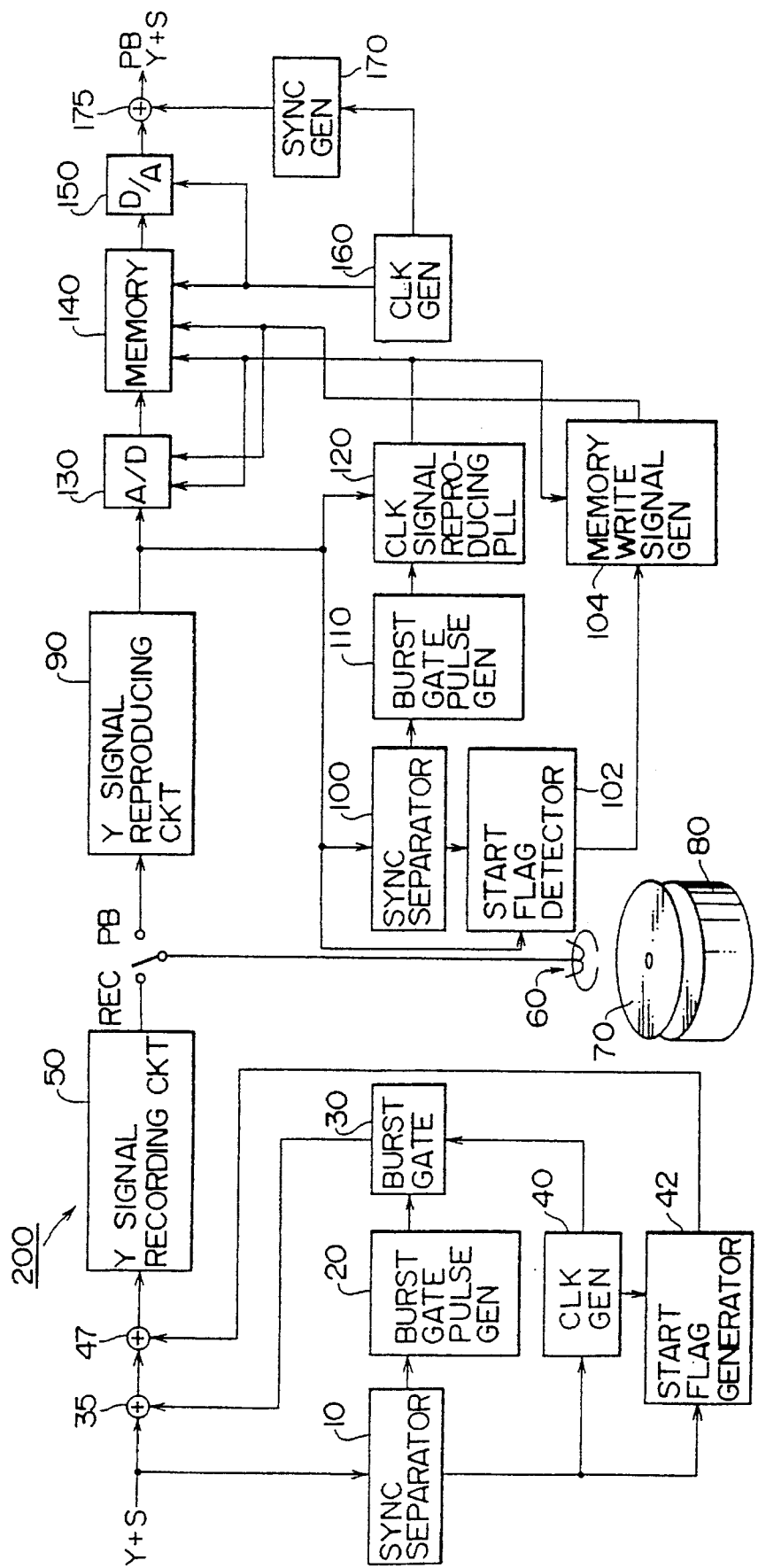
FIG. 1 is a block diagram of a known video signal recording and reproducing apparatus.

Since the video signal processed by the video signal recording and reproducing apparatus 200 shown in FIG. 1 is required to having respective intervals in which the reference signal and the start flags are added, the effective horizontal period is reduced by those intervals. Such a drawback is eliminated by the video signal recording and reproducing apparatus 200A according to the present invention, as shown in FIG. 2.

Those parts of the video signal recording and reproducing apparatus 200A shown in FIG. 2 which are identical to those in the video signal recording and reproducing apparatus 200 shown in FIG. 1 are denoted by identical reference numerals, and will not be described in detail below.

Figure 2:
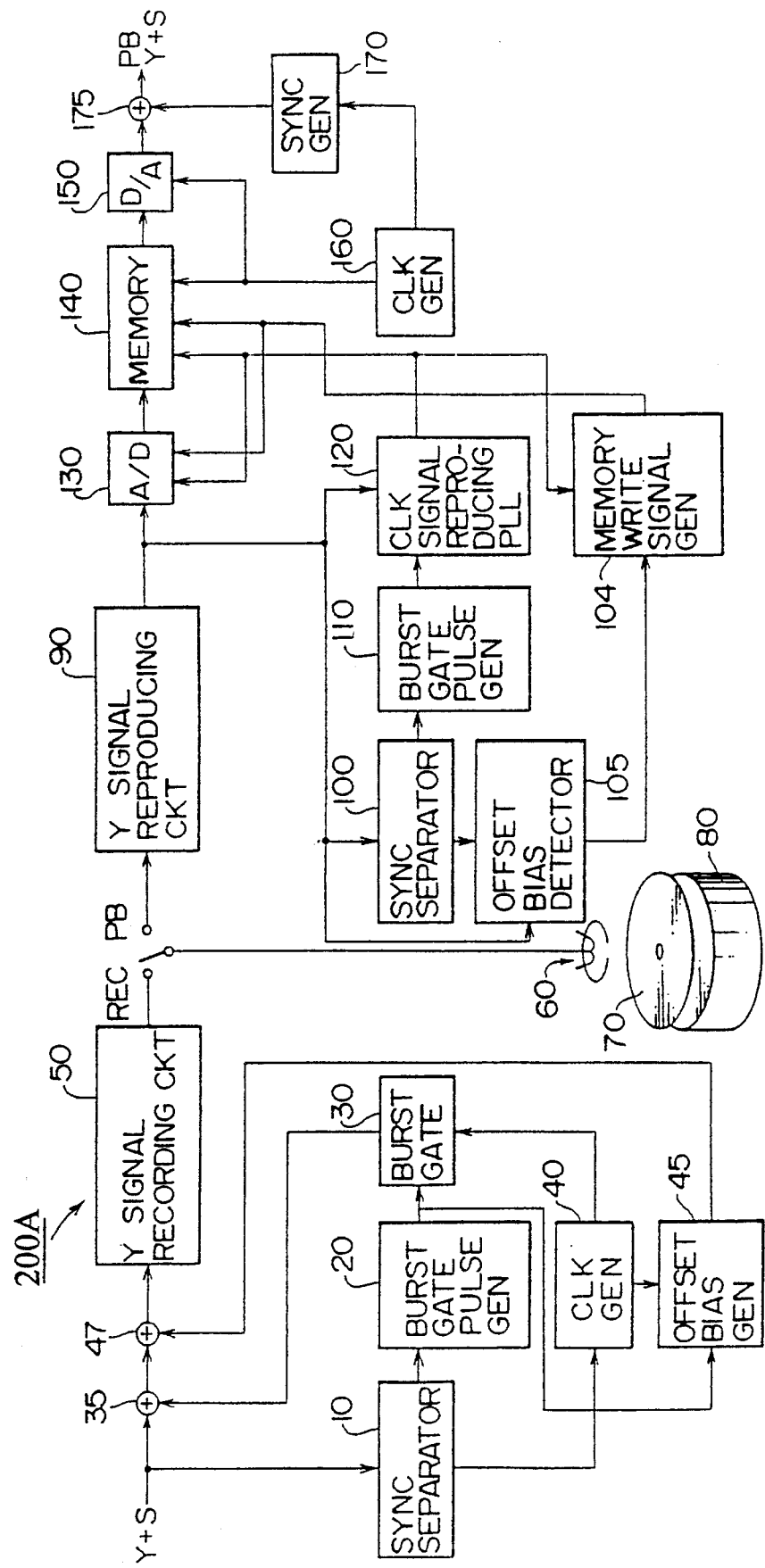
FIG. 2 is a block diagram of a video signal recording and reproducing apparatus according to the present invention.

As shown in FIG. 2, the video signal recording and reproducing apparatus 200A has an offset bias generator 45 in place of the start flag generator 42 shown in FIG. 1 and an offset bias detector 105 in place of the start flag detector 102 shown in FIG. 1.

Figure 4:
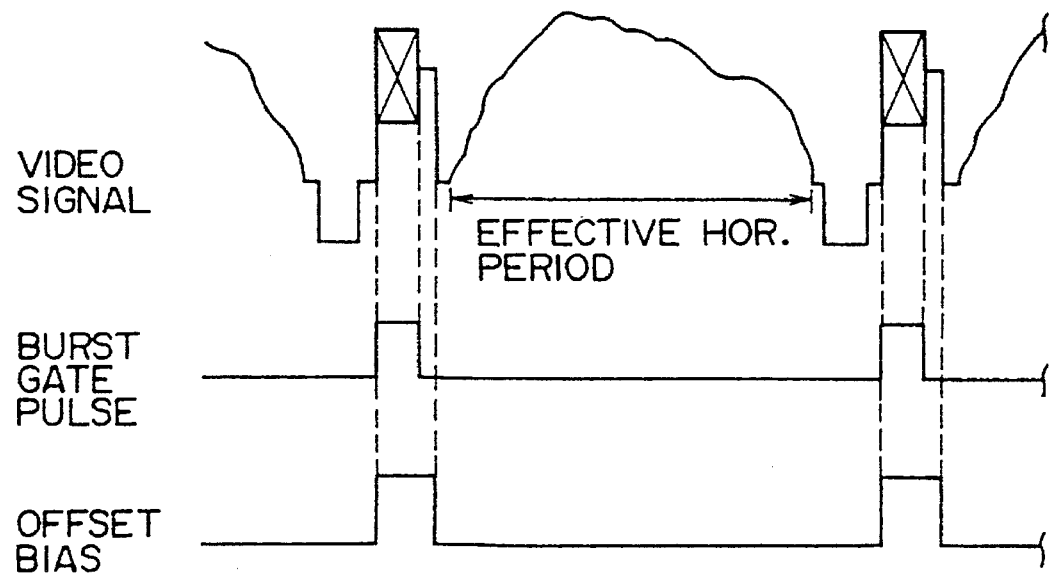
FIG. 4 is a timing chart showing the timing relationship between a video signal, burst gate pulses and a start flag in the video signal recording and reproducing apparatus shown in FIG. 2.

The offset bias generator 45 is supplied with burst gate pulses from the burst gate pulse generator 20 and a reference signal, i.e., a clock signal, from the clock signal generator 40. The offset bias generator 45 counts clock pulses of the clock signal, and generates a DC bias voltage for a predetermined period of time including at least the period of time in which a burst gate pulse is high. The generated DC bias voltage is added to the video signal Y+S by the adder 47. While a burst gate pulse is high, therefore, the reference signal (i.e., burst signal) from the clock signal generator 40 is added to the video signal Y+S by the adder 35, and at the same time the DC level (the pedestal level) of the video signal is increased by the DC bias voltage which is added by the adder 47, as shown in FIG. 4.

The video signal Y+S with the reference signal added at the increased DC level is then frequency-modulated by the Y-signal recording circuit 50 and recorded on the magnetic disk 70 through the magnetic head 60.

In the reproducing process, the video signal Y+S recorded on the magnetic disk 70 is read by the magnetic head 60 and then frequency-demodulated by the Y-signal reproducing circuit 90. The frequency-demodulated video signal Y+S is supplied from the Y-signal reproducing circuit 90 to the synchronizing signal separator 100, the offset bias detector 105, clock signal reproducing PLL 120, and the A/D converter 130.

Figure 3:
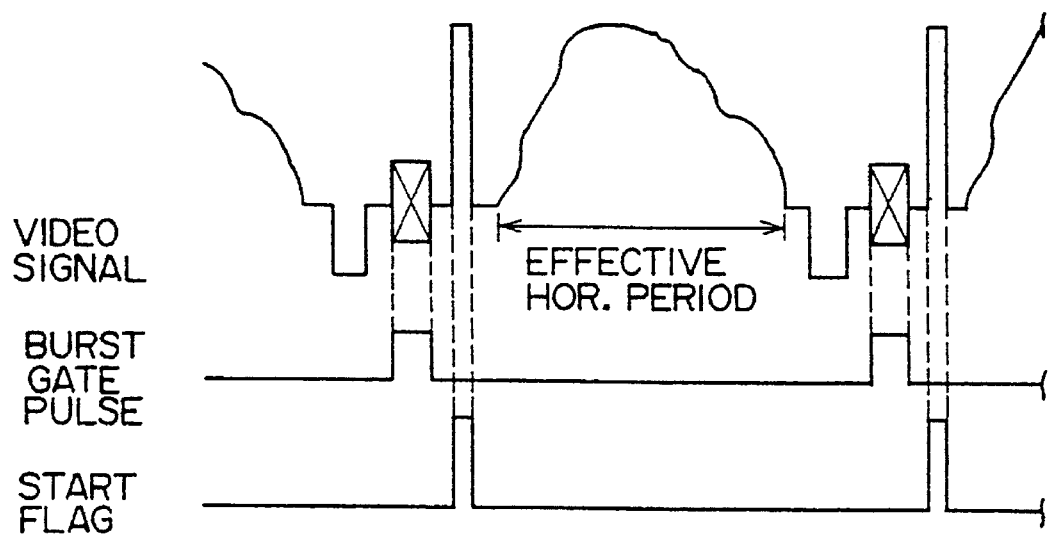
FIG. 3 is a timing chart showing the timing relationship between a video signal, burst gate pulses, and a start flag in the known video signal recording and reproducing apparatus shown in FIG. 1.

The offset bias detector 105 serves to detect a falling edge of the DC component of the reference signal (i.e., the bias detector 105 detects the time at which the signal including the DC bias component becomes absent). Therefore, the DC component of the reference signal functions as a start flag that has been described with reference to FIGS. 1 and 3. The detected falling edge triggers the memory write signal generator 104 to produce a memory write signal for writing video information into the memory 140 during an effective horizontal period. The stored video information is then read and supplied to the display unit in the manner described above with reference to FIG. 1.

Figure 5:
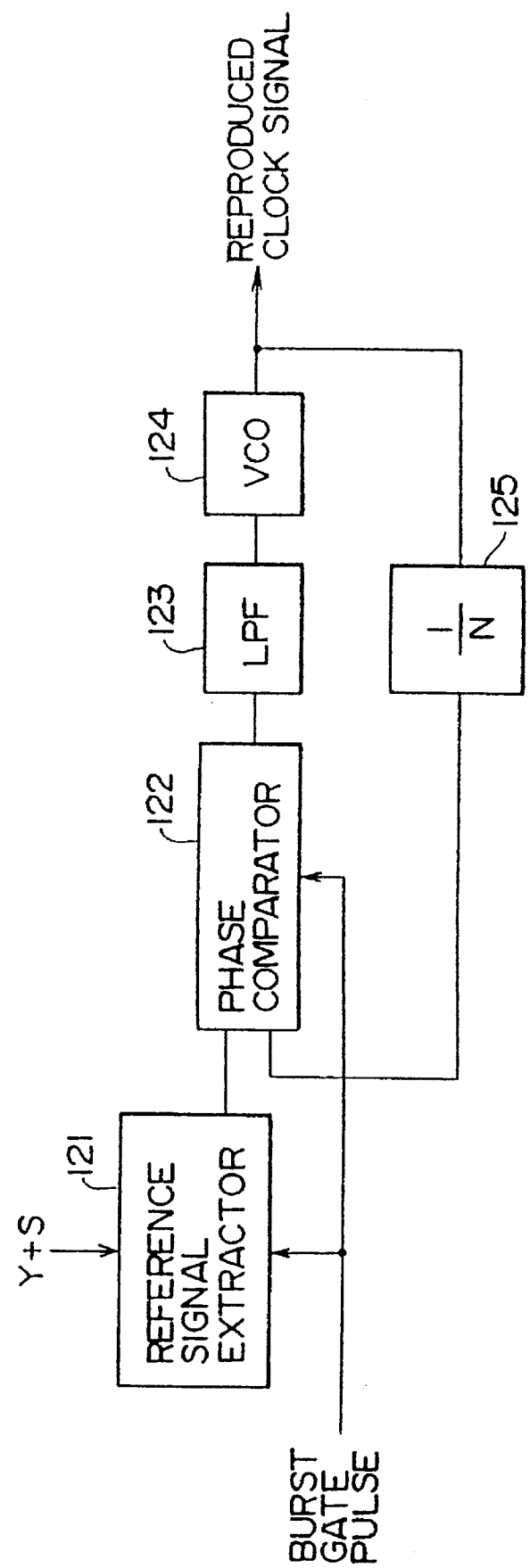
FIG. 5 is a block diagram of a clock signal reproducing PLL of a video signal recording and reproducing apparatus.

The clock signal reproducing PLL 120 is shown in specific detail in FIG. 5. The clock signal reproducing PLL 120 comprises a reference signal extractor 121, a phase comparator 122, a low-pass filter 123, a voltage-controlled oscillator 124, and a divide-by-N frequency divider 125. The reference signal extractor 121, which is supplied with the video signal Y+S read from the magnetic disk 70 and the burst gate pulses, extracts the reference signal from the video signal Y +S based on the burst gate pulses. The extracted reference signal is supplied to the phase comparator 122 which is also supplied with a signal from the divide-by-N frequency divider 125 that divides, by N, the frequency of an output signal from the voltage-controlled oscillator 124. The phase comparator 122 applies an output signal to the low-pass filter 123, whose output signal is supplied to the voltage-controlled oscillator 124. The phase comparator 122, the low-pass filter 123, the voltage-controlled oscillator 124, and the divide-by-N frequency divider 125 jointly make up a phase-locked loop for outputting a reproduced clock signal that is locked on the reference signal. If the phase comparator 122 is operated in the absence of any reference signal from the reference signal extractor 121, then the output clock signal would be out of synchronism with the reference signal. To prevent this from happening, the burst gate signals are supplied to the phase comparator 122 to enable the phase comparator 12 to compare the phases of the supplied signals only when the reference signal is extracted from the video signal Y+S.

Since the digital video signal is written into the memory 140 based on the reproduced clock signal that is locked on the reference signal, the video data stored in the memory 140 represents, with high fidelity, the video signal as it is recorded on and/or reproduced from the magnetic disk 70.

The video signal recording and reproducing apparatus 200A shown in FIG. 2 is capable of reproducing video images of high quality since the effective horizontal period is relatively long.

The present disclosure relates to the subject matter contained in Japanese Patent Application No. HEI 4-263212, filed on Sep. 4, 1992, which is expressly incorporated herein in its entirety.

What is claimed is:

1. An apparatus for recording and reproducing a video signal from a recording medium, comprising:

signal adding means for adding a first reference signal and a second reference signal to said video signal to produce a modified video signal, wherein said second reference signal comprises a DC component which is added to said video signal for at least a duration of said first reference signal, wherein said DC component comprises a level higher than a vertical blanking level, and wherein falling trailing edges of said first reference signal and said DC component of said second reference signal are separated in time;

recording means for recording said modified video signal on said recording medium;

reproducing means for reproducing said modified video signal from said recording medium;

signal extracting means for extracting said first reference signal from said modified video signal reproduced by said reproducing means;

signal detecting means for detecting said falling trailing edge of said DC component of said second reference signal; and video signal extracting means for extracting said video signal from said modified video signal, wherein said video signal extracting means is controlled by signal characteristics of the extracted first reference signal and the detected falling trailing edge of said DC component of said second reference signal, wherein said falling trailing edge of said DC component of said second reference signal occurs prior in time, in the modified video signal, to a period for storing video information of the video signal.

2. The apparatus according to claim 1, wherein said signal extracting means comprises a phase-locked loop circuit, and further wherein said modified video signal is fed to an input of said phase-locked loop and said first reference signal is output from said phase-locked loop.

3. The apparatus according to claim 2, wherein the first reference signal output by said phase-locked loop comprises signal characteristics which are different from signal characteristics of said first reference signal added to said video signal by said signal adding means.

4. The apparatus according to claim 3, wherein said video signal extracting means further comprises:

memory means for storing said modified video signal, said memory means storing said modified video signal by using timing characteristics of said first reference signal output by said phase-locked loop, wherein a duration of storing said modified video signal to said memory means is based upon said detected second reference signal;

reading means for reading out said modified video signal stored in said memory means; and timing means for producing a constant frequency clock signal, wherein said reading means reads out said modified video signal based on said constant frequency clock signal.

5. The apparatus according to claim 1, wherein said first reference signal is a sine wave having a frequency which is 227.5 times larger than a frequency of a horizontal synchronizing signal of said video signal.

6. The apparatus according to claim 1, wherein said second reference signal is added to said video signal at the same time during which said first reference signal is added to said video signal.

7. An apparatus for reproducing a video signal from a recording medium, said video signal being contained within a modified video signal, said modified video signal further comprising a first reference signal added to said video signal and a second reference signal added to said video signal, wherein said second reference signal comprises a DC component which is added to said video signal for at least a duration of said first reference signal, said DC component comprising a level higher than a vertical blanking level, and wherein falling trailing edges of said first reference signal and said DC component of said second reference signal are separated in time; said apparatus comprising:

reproducing means for reproducing said modified video signal from said recording medium;

signal extracting means for extracting said first reference signal from said modified video signal reproduced by said reproducing means;

signal detecting means for detecting said falling trailing edge of said DC component of said second reference signal in said modified video signal; and video signal extracting means for extracting said video signal from said modified video signal, wherein said video signal extracting means is controlled by signal characteristics of the extracted first reference signal and the detected falling trailing edge of said second reference signal, and wherein said falling trailing edge of said DC component of said second reference signal occurs prior in time, in the modified video signal, to a period for storing video information of the video signal.

8. The apparatus according to claim 7, wherein said signal extracting means comprises a phase-locked loop circuit, wherein said modified video signal is fed to an input of said phase-locked loop and said reference signal is output from said phase-locked loop.

9. The apparatus according to claim 8, wherein said first reference signal output by said phase-locked loop comprises signal characteristics which are different from signal characteristics of said first reference signal added to said video signal by said first signal adding means.

10. The apparatus according to claim 9, wherein said video signal extracting means further comprises:

memory means for storing said modified video signal, said memory means storing said modified video signal by using timing characteristics of said first reference signal output by said phase-locked loop, wherein a duration of storing said modified video signal to said memory means is based upon said detected second reference signal;

reading means for reading out said modified video signal stored in said memory means; and timing means for producing a constant frequency clock signal, wherein said reading means reads out said modified video signal based on said constant frequency clock signal.

11. The apparatus according to claim 7, wherein said second reference signal is added to said video signal at the same time during which said first reference signal is added to said video signal.

* * * * *